United States Patent
Awwad et al.

(10) Patent No.: US 10,491,300 B2
(45) Date of Patent: Nov. 26, 2019

(54) METHOD AND SYSTEM OF OPTICAL FIBRE WITH SWITCHING OF MODES AND/OR CORES

(71) Applicant: INSTITUT MINES-TELECOM, Paris (FR)

(72) Inventors: Elie Awwad, Paris (FR); Ghaya Rekaya-Ben Othman, Antony (FR); Yves Jaouen, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/322,612

(22) PCT Filed: Jun. 26, 2015

(86) PCT No.: PCT/EP2015/064499
§ 371 (c)(1),
(2) Date: Dec. 28, 2016

(87) PCT Pub. No.: WO2016/001078
PCT Pub. Date: Jan. 7, 2016

(65) Prior Publication Data
US 2017/0195052 A1 Jul. 6, 2017

(30) Foreign Application Priority Data
Jul. 1, 2014 (FR) .................................. 14 56284

(51) Int. Cl.
*H04B 10/2581* (2013.01)
*H04B 10/2507* (2013.01)
*H04J 14/04* (2006.01)

(52) U.S. Cl.
CPC ..... *H04B 10/2581* (2013.01); *H04B 10/2507* (2013.01); *H04J 14/04* (2013.01)

(58) Field of Classification Search
None
See application file for complete search history.

(56) References Cited

U.S. PATENT DOCUMENTS

| 4,804,248 A * | 2/1989 | Bhagavatula | ...... H04B 10/2581 385/28 |
| 6,525,853 B1 * | 2/2003 | Stuart | ................ H04B 10/2581 385/18 |

(Continued)

FOREIGN PATENT DOCUMENTS

| EP | 2541809 A1 | 1/2013 |
| FR | 2930861 A | 11/2009 |

(Continued)

OTHER PUBLICATIONS

Newport, Fiber Optic Basics, 2011.*

(Continued)

*Primary Examiner* — Kenneth N Vanderpuye
*Assistant Examiner* — Jai M Lee
(74) *Attorney, Agent, or Firm* — Meagher Emanuel Laks Goldberg & Liao, LLP

(57) ABSTRACT

The invention relates to a system and a method for transmission over optical fiber (130) with mode or core scrambling. The system comprises a spatio-temporal encoder (110) and a plurality of modulators ($125_1$, . . . , $125_n$) associated, respectively, with separate propagation modes or cores of said fiber, each modulator modulating a laser beam. Said fiber comprises a plurality of slices ($130_1$, . . . , $130_L$), an amplifier ($140^i$) being provided between any two consecutive slices of the optical fiber. A mode scrambler ($150^i$) is associated with each amplifier in order to perform a permutation of said modes between at least two consecutive slices.

20 Claims, 6 Drawing Sheets

(56) References Cited

U.S. PATENT DOCUMENTS

| | | | | |
|---|---|---|---|---|
| 8,320,769 | B2* | 11/2012 | Essiambre | G02B 6/14 398/143 |
| 8,538,275 | B2* | 9/2013 | Essiambre | G02B 6/29311 398/143 |
| 8,891,964 | B2* | 11/2014 | Cvijetic | H04J 14/04 398/142 |
| 9,264,171 | B2* | 2/2016 | Chang | H04B 10/2581 |
| 9,819,439 | B2* | 11/2017 | Ryf | H04J 14/04 |
| 10,164,739 | B2* | 12/2018 | Rekaya Ben-Othman | H04B 10/2581 |
| 10,218,442 | B2* | 2/2019 | Amhoud | H04B 10/516 |
| 2003/0123877 | A1* | 7/2003 | Lo | H04B 10/532 398/34 |
| 2006/0127100 | A1* | 6/2006 | Frankel | H04B 10/29 398/158 |
| 2010/0329693 | A1* | 12/2010 | Chen | H04B 10/85 398/147 |
| 2013/0121698 | A1* | 5/2013 | Li | H04J 14/00 398/65 |
| 2014/0126915 | A1* | 5/2014 | Gruner-Nielsen | H04J 14/04 398/143 |
| 2014/0286648 | A1* | 9/2014 | Buelow | G02B 6/2808 398/143 |
| 2014/0314410 | A1* | 10/2014 | Mumtaz | H04B 10/2581 398/65 |
| 2017/0070298 | A1* | 3/2017 | Elgala | H04L 27/2697 |
| 2018/0019817 | A1* | 1/2018 | Rekaya Ben-Othman | H04B 10/2581 |

FOREIGN PATENT DOCUMENTS

| | | | | |
|---|---|---|---|---|
| FR | 2977099 | A1 | 12/2012 | |
| WO | WO-2012151362 | A2 * | 11/2012 | H04B 10/2581 |
| WO | WO 2012175697 | A1 * | 12/2012 | H04B 10/2581 |

OTHER PUBLICATIONS

Li et al., Transmission of 107-Gb/s mode and polarization multiplexed CO-OFDM signal over a two-mode fiber, 2011, OSA, pp. 8808-8814.*

Othman et al, Algebraic Space-Time Bloc Codes, 2008.*

H. El Gamal et al. entitled "Universal Space-Time Coding", published in IEEE Trans. on Information Theory, vol. 49, n° 5, May 2003.

G. Le Coq et al. entitled "Few-mode Er3+ doped fiber with micro-structured core for mode division multiplexing in the C-band" published in Optics Express, vol. 21, No. 25 pp. 31646-31659, Dec. 2013.

An Li et al. entitled "Transmission of 107-Gb/s mode and polarization multiplexed CO-OFDM signal over a two-mode fiber", published in Optics Express, Apr. 25, 2011, vol. 19, N° 9, pp. 8808-8814.

Gaya Rekaya Ben Othman et al. entitled "The spherical bound stack decoder", published in IEEE Int'l Conf. on wireless and mobile computing, networking and communications (WiMob), Avignon, France, Oct. 2008.

F. Oggier et al. entitled "Perfect space-time block codes" published in Trans. on Information Theory, vol. 52, No. 9, Sep. 2006.

International Search Report for PCT/EP2015/064499, dated Sep. 21, 2015.

Written Opinion for PCT/EP2015/064499, dated Sep. 21, 2015.

Chen et al., "Design of add-drop multiplexer based on multi-core optical fibers for mode-division multiplexing", Optics Express, vol. 22, No. 2, pp. 1440-1451, Jan. 27, 2014 (Jan. 27, 2014).

Alireza Tarighat et al., "Fundamentals and Challenges of Optical Multi-Input Multi-Output Multimode Fiber Links", IEEE Communications Magazine, IEEE Service Center, Piscataway, US, pp. 57-63, May 1, 2007 (May 1, 2007).

* cited by examiner

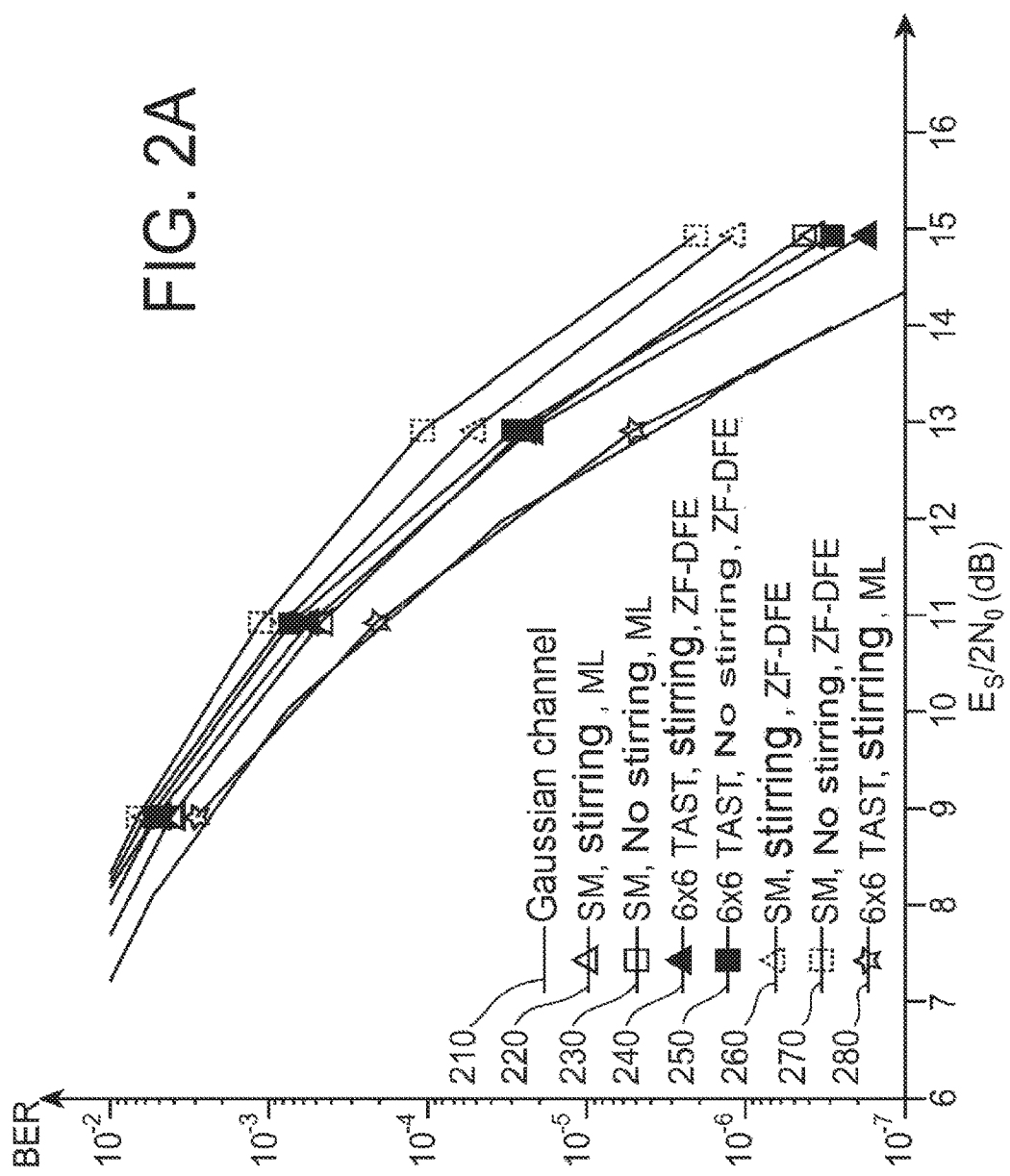

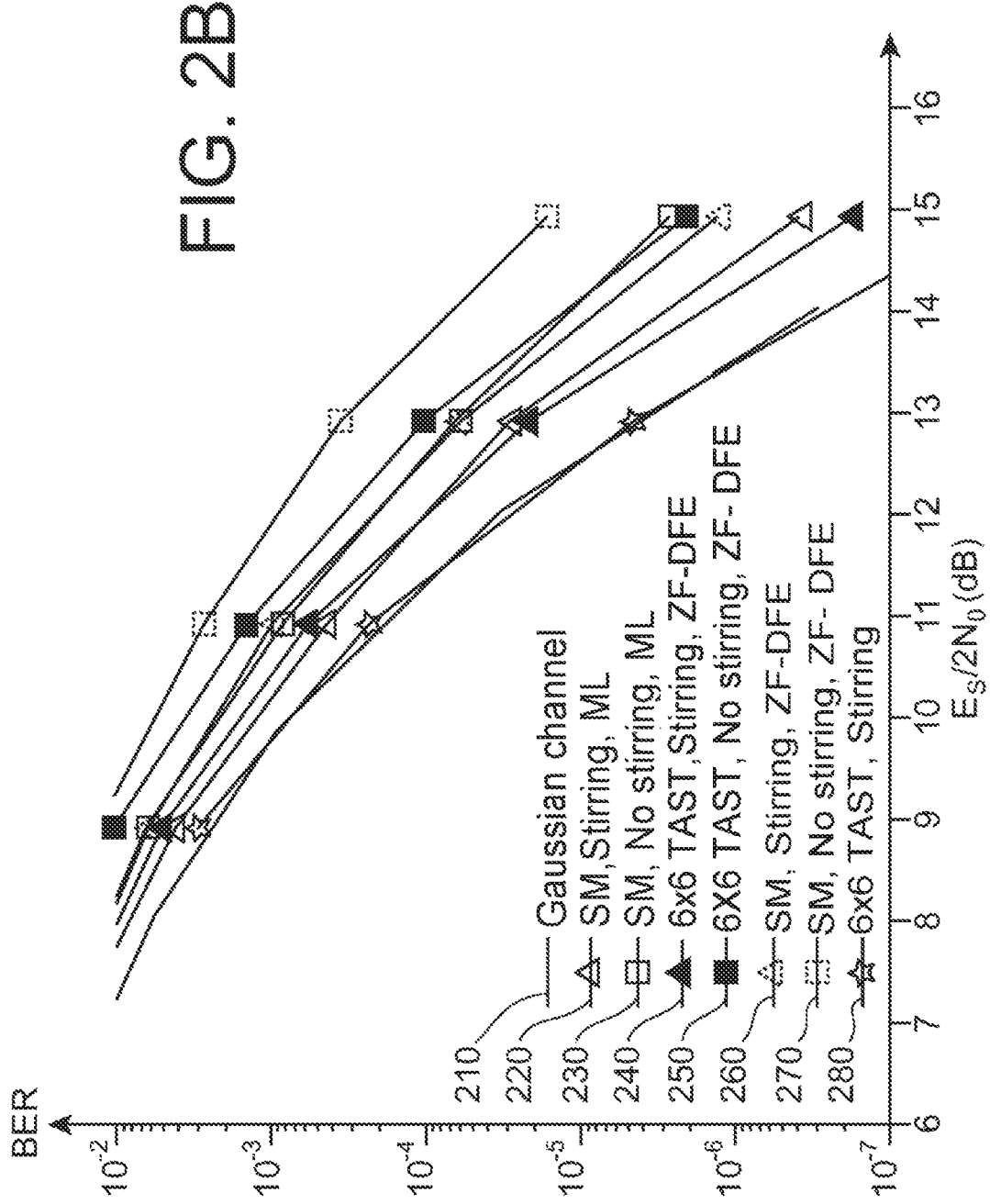

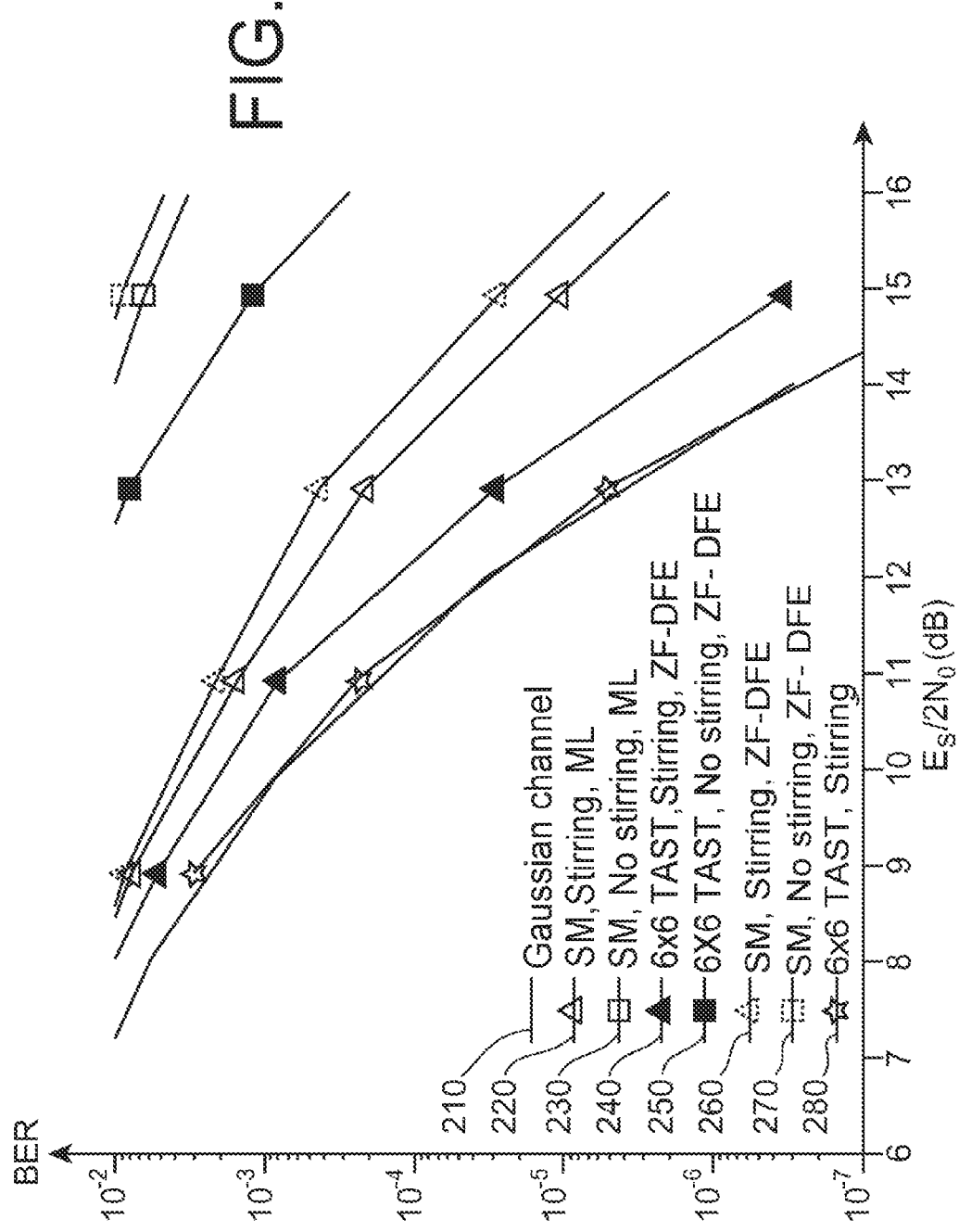

METHOD AND SYSTEM OF OPTICAL FIBRE WITH SWITCHING OF MODES AND/OR CORES

TECHNICAL FIELD

The present invention generally relates to the field of optical telecommunications and, more particularly, to those using optical fibers of multimode or multicore type.

PRIOR ART

Optical transmissions over long distance (several hundred to several thousand km) use single-mode optical fibers. These have the advantage of not exhibiting modal dispersion (apart from polarization mode dispersion) and of being able to handle high bitrates of many tens of Gbit/s per wavelength, even for a plurality of wavelengths.

However, for transmissions over short distances, in particular for wideband local area networks (LANs), multimode or multicore fibers constitute a particularly advantageous alternative to single-mode fibers. It is possible to distinguish between two types of multimode fibers: plastic fibers (or POF) and silica fibers. The first are generally used along with simple energy detection at the end of the line, without multiplexing the data over the various modes. The second, on the other hand, generally permit the propagation of only a small number of modes, but are used along with multiplexing and detection of data over the various modes, which makes them advantageous to ensure high transmission capacities over both short and long distances.

Silica multimode fibers have a large-diameter core permitting multiple guided modes to be propagated, denoted by $L_{lp}$ for rectilinear polarization, where l is the azimuthal mode index and p is the radial mode index. The mode $LP_{01}$ is the fundamental mode, the only one able to be propagated through a single-mode fiber. The total number of modes $L_{lp}$ depends on the optogeometric parameters (core diameter, index profile in particular). The information to be transmitted is distributed over the various guided modes. When the number of guided modes is small, weakly multimode optical fiber is spoken of. More specifically, an optical fiber is said to be weakly multimode if its normalized frequency parameter V is such that <8.

The bandwidth of multimode fibers is generally higher than that of single-mode fibers, each mode being modulated separately and the signal to be transmitted being multiplexed over the various modes. This bandwidth is nonetheless limited by the intermodal coupling $L_{lp}$ during propagation (intermodal crosstalk).

Furthermore, for long distances, amplifiers must be provided between slices of optical fiber. Owing to the gain mode dispersion of these amplifiers (along with that due to other optical components such as multiplexers or demultiplexers, for example) and, to a lesser degree, owing to imperfections in the fiber (splices between slices in particular), the various modes are not subject to the same level of attenuation. Mode-dependent loss (MDL) $L_{lp}$ leads to increased sensitivity to noise sources, which may substantially limit the range of these systems.

Multicore fibers comprise a plurality of cores (generally between two and seven cores) within a shared sheath. The size of the cores is small enough that only single-mode propagation is permitted through each one. In contrast to multimode fibers, these therefore exhibit no modal dispersion. However, the evanescent waves cause coupling between the various cores (intercore crosstalk); the level of crosstalk is proportionally higher the larger the number of cores and the shorter the intercore distance. Like the intermode coupling mentioned above, intercore coupling limits the range of these systems.

It has been proposed in the application FR-A-2977099, which is in the name of the present applicant, to use spatio-temporal encoding to transmit symbols over a plurality of modes (in a weakly multimode fiber) or cores. This technique allows the bit error rate to be substantially decreased in the case of intermode or intercore crosstalk. However, for one and the same signal-to-noise ratio, the bit error rate still remains higher than that which would be observed for an additive Gaussian channel.

Consequently, the aim of the present invention is to further decrease the bit error rate in the case of transmission over multimode or multicore optical fiber.

SUMMARY OF THE INVENTION

The present invention is defined by a system for optical transmission over multimode fiber comprising:
an encoder, referred to as a spatio-temporal encoder, transforming each block of symbols to be transmitted into a code matrix, each element of said matrix being related to a time of use and to a propagation mode of said fiber;
a plurality of modulators associated, respectively, with separate propagation modes of said fiber, each modulator modulating a laser beam for a time of use by means of a corresponding element of the matrix, each laser beam thus modulated being injected into said fiber in order to propagate therethrough in a separate mode;
in which:
said fiber comprises a plurality of slices, an amplifier being provided between any two consecutive slices in order to amplify the intensity of the beams being propagated in said modes;
a mode scrambler is associated with said amplifier in order to perform a permutation of said modes between at least two consecutive slices.

The invention also relates to a system for optical transmission over multicore fiber comprising:
an encoder, referred to as a spatio-temporal encoder, transforming each block of symbols to be transmitted into a code matrix, each element of said matrix being related to a time of use and to a core of said fiber;
a plurality of modulators associated, respectively, with cores of said fiber, each modulator modulating a laser beam for a time of use by means of a corresponding element of the matrix, each laser beam thus modulated being injected into a separate core of said fiber;
in which:
said fiber comprises a plurality of slices, an amplifier being provided between any two consecutive slices in order to amplify the intensity of the beams being propagated through said plurality of cores;
a core scrambler is associated with said amplifier in order to perform a permutation of the beams of the various cores between at least two consecutive slices.

The spatio-temporal encoder may use a TAST code or a perfect code.

The modulator is advantageously a QAM modulator, followed by an OFDM modulator.

According to a first variant, the amplifiers are optical amplifiers.

According to a second variant, the amplifiers each comprise a plurality of photodiodes for converting the optical signals of the various modes to electrical signals, elementary amplifiers amplifying the various electrical signals, and a plurality of laser diodes modulated, respectively, by the electrical signals thus amplified.

Regardless of the embodiment, P mode/core scramblers may be advantageously provided for every Q amplifiers, the ratio P/Q being chosen so that the gain mode dispersion of the fiber is substantially equal to the value $\Delta G \cdot \sqrt{L}$, where L is the number of slices of the optical fiber.

The invention also relates to a method for optical transmission over multimode fiber comprising:
- an encoding operation, referred to as a spatio-temporal encoding, transforming each block of symbols to be transmitted into a code matrix, each element of said matrix being related to a time of use and a propagation mode of said fiber;
- modulating a plurality of laser beams associated with the various modes, each laser beam being modulated for a time of use by means of a corresponding element of the matrix, each laser beam thus modulated being injected into said fiber in order to propagate therethrough according to a separate mode;

in which:
- the intensity of the beams propagating in said modes is amplified between any two consecutive slices of said fiber;
- the modes are scrambled between at least two consecutive slices.

Lastly, the invention relates to a method for optical transmission over multicore fiber comprising:
- an encoding operation, referred to as a spatio-temporal encoding, transforming each block of symbols to be transmitted into a code matrix, each element of said matrix being related to a time of use and a core of said fiber;
- modulating a plurality of laser beams associated with the various cores, each laser beam being modulated for a time of use by means of a corresponding element of the matrix, each laser beam thus modulated being injected into a separate core of said fiber;

in which:
- the intensity of the beams propagating through said cores is amplified between any two consecutive slices of said fiber;
- the beams of the various cores are scrambled between at least two consecutive slices.

The spatio-temporal encoder may use a TAST code or a perfect code.

Advantageously, the modulation comprises a first, QAM modulation step followed by a second, OFDM modulation step.

According to a first variant, the amplification between two consecutive slices is carried out by means of optical pumping.

According to a second variant, the amplification between two consecutive slices is carried out by means of optical-electrical conversion, amplification of the electrical signals thus obtained and electrical-optical conversion of the electrical signals thus amplified.

Regardless of the embodiment, P mode/core scrambling steps may be advantageously provided for every Q mode/core scrambling steps may be amplification steps, the ratio P/Q being chosen so that the gain mode dispersion of the fiber is substantially equal to the value $\Delta G \cdot \sqrt{L}$, where L is the number of slices of the optical fiber.

BRIEF DESCRIPTION OF THE DRAWINGS

Other features and advantages of the invention will become apparent upon reading preferred embodiments of the invention, with reference to the appended figures in which:

FIGS. 2A to 2C schematically show the variation in the bit error rate depending on the signal-to-noise ratio in the case of the transmission system of FIG. 1, for various levels of intermodal coupling and various detection methods;

DETAILED DESCRIPTION OF PARTICULAR EMBODIMENTS

The invention will first be described in the case of a transmission over multimode optical fiber, and, more particularly, in the case of a weakly multimode optical fiber. As mentioned in the introduction, a multimode fiber is affected by gain mode dispersion or mode-dependent loss (MDL), whose effects in terms of bit error rate may be combated by means of spatio-temporal encoding, the spatial variable used being, in this case, a mode of propagation through the fiber.

Figure 1:
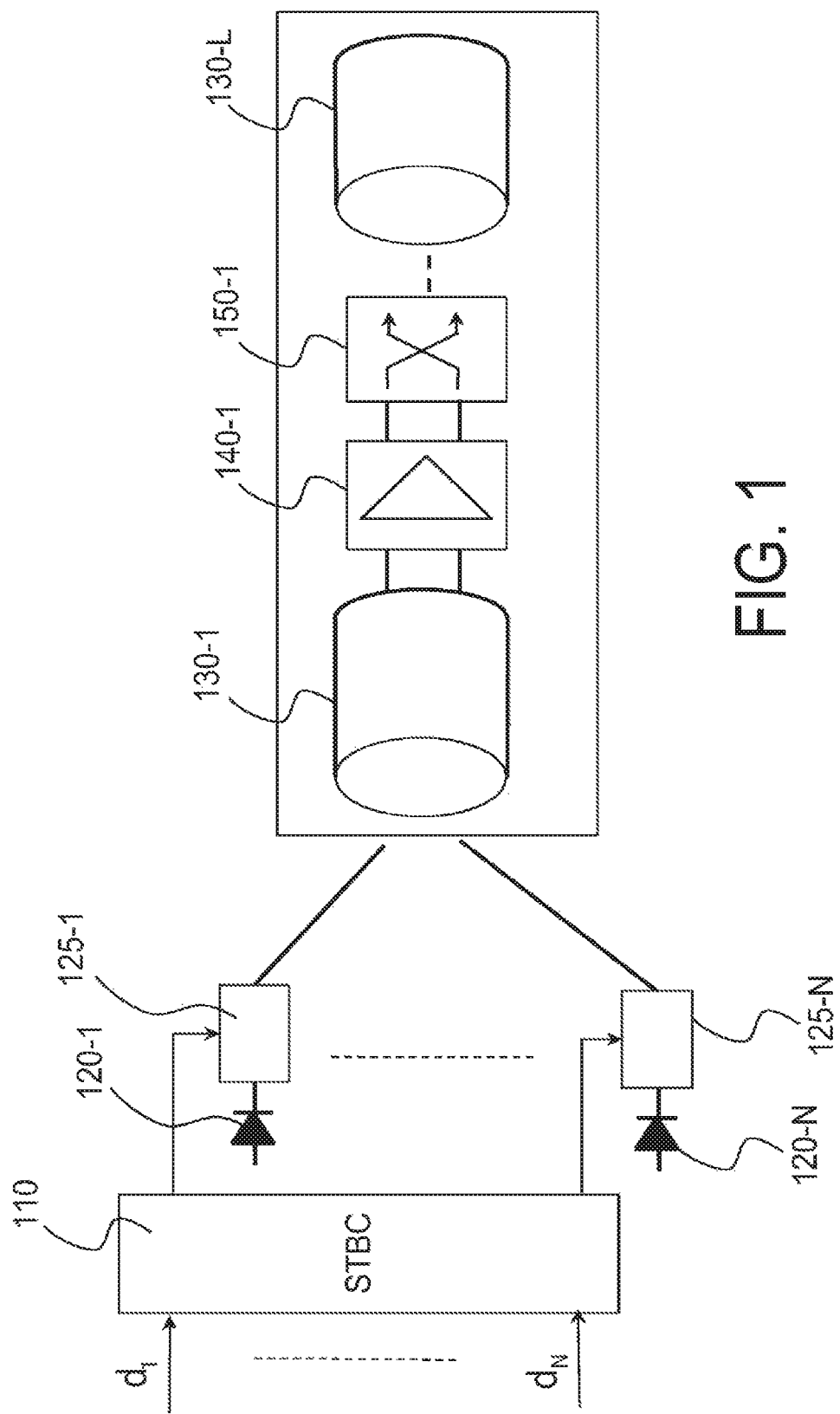
FIG. 1 schematically shows a system for transmission over optical fiber according to a first embodiment of the invention.

The basic idea of the first embodiment of the invention is to combine spatio-temporal encoding with mode scrambling. More specifically, an optical transmission system according to this first embodiment is shown in FIG. 1.

This transmission system comprises a spatio-temporal encoder 110. The stream of symbols to be transmitted is divided into blocks of size B, each block being transmitted in a transmission interval or TTI (time transmission interval). The encoder associates, with each block of symbols, a matrix C of size N×T, referred to as hereinafter as a spatio-temporal matrix:

$$C = \begin{pmatrix} c_{1,1} & c_{1,2} & \cdots & c_{1,T} \\ c_{2,1} & c_{2,2} & \cdots & c_{2,T} \\ \vdots & \vdots & \ddots & \vdots \\ c_{N,1} & c_{N,2} & \cdots & c_{N,T} \end{pmatrix} \quad (1)$$

where the elements of the matrix, $c_{n,t}$, n=1, . . . , N, t=1, . . . , T (where N≥2 and T≥2), are, as a rule, complex coefficients dependent on the symbols to be transmitted, N is the number of modes used, T is an integer indicating the temporal extension of the code, i.e. the number of times the channel, in this instance the fiber, is used.

The spatio-temporal code will advantageously be a TAST (threaded algebraic space-time) code such as described in the article by H. El Gamal et al. entitled "Universal Space-Time Coding", published in IEEE Trans. on Information Theory, Vol. 49, no. 5, May 2003. Alternatively, it will be possible to use a perfect code as the spatio-temporal code. A description of perfect codes will be found in the article by F. Oggier et al. entitled "Perfect space-time block codes" published in Trans. on Information Theory, vol. 52, No. 9, September 2006.

The optical transmission system comprises N lasers $120_n$, n=1, . . . , N of the same wavelength, or else alternatively a single laser whose beam is split into N separate beams. In any case, the beams are modulated by the various respective outputs of the spatio-temporal encoder. More specifically, at time t, the element $c_{n,1}$ modulates the optical signal of the laser 120-$n$ by means of the modulator 125-$n$, for example a Mach-Zehnder modulator, known per se. The modulation in question is amplitude modulation (QAM). The types of modulation used for the various beams are not necessarily identical.

The modulators 125-$n$ will each comprise a first, QAM modulator followed by a second, OFDM modulator (not shown in the figure), as applicable. The use of OFDM modulation for the various modes makes it possible to be rid of the propagation time modal dispersion by choosing the size of the cyclic prefix to be higher than the maximum temporal spread of propagation.

In any event, the optical beams thus modulated each excite one mode of the multimode fiber 130. This selective excitation may be achieved either by means of an optical device in free space or by means of a guided optics multiplexer.

The N modes used may represent all of the modes of the optical fiber. This may particularly be the case when the optical fiber is weakly multimode. The multimode fiber 130 comprises a plurality L of slices, 130$^l$, $l=1, \ldots, L$, an amplifier 140$^l$ being provided between each pair of consecutive slices 130$^l$ and 130$^l+1$. The amplifier is advantageously an optical amplifier of FMA (few-mode amplifier) type, suitable for simultaneously amplifying the intensity of a plurality of modes of the fiber. The optical amplifier may amplify the various modes via optical pumping, for example. An exemplary FMA amplifier using optical pumping in an erbium-doped optical fiber, or FM-EDFA (few-mode erbium-doped fiber amplifier), is described in the article by G. Le Coq et al. entitled "Few-mode Er3+ doped fiber with micro-structured core for mode division multiplexing in the C-band" published in Optics Express, vol. 21, No. 25 pp. 31646-31659, December 2013.

According to a second variant, the amplifier 140$^l$ may comprise a plurality of photodiodes for converting the optical signals of the various modes (separated by means of a diffraction grating, for example) to electrical signals, elementary amplifiers amplifying the various electrical signals, and a plurality of laser diodes modulated, respectively, by the electrical signals thus amplified. After amplification, the electrical signals may undergo analog-digital conversion, digital filtering and then digital-analog conversion. A plurality of streams of digital samples, respectively associated with the various modes, is thus obtained.

Regardless of the envisaged variant, a mode scrambler may be associated with the amplifier. In the case illustrated, a mode scrambler, 150$^l$, is associated with each amplifier 140$^l$. This mode scrambler performs a permutation of the plurality of modes $1, \ldots, N$. The term "permutation" is understood to mean any bijection of the set of modes onto itself, distinct from the identity. This permutation may be, for example, a circular permutation over the set of modes $1, \ldots, N$. Advantageously, for each slice, the permutation is a random permutation from among the $N!-1$ possible permutations. The mode scrambler may be produced by applying mechanical stresses to the fiber. An exemplary embodiment of a mode scrambler may be found in the article by An Li et al. entitled "Transmission of 107-Gb/s mode and polarization multiplexed CO-OFDM signal over a two-mode fiber", published in Optics Express, 25 Apr. 2011, vol. 19, No 9, pp. 8808-8814. Other types of mode scramblers are commercially available, for example SDM (space division multiplexing) mode scramblers by the company Phoenix Photonics.

It is important to note that when the amplifier is implemented according to the second variant mentioned above, mode scrambling may be achieved simply by scrambling the streams of digital samples relating to the various modes. Thus, the mode scrambler may be produced either optically or digitally (and, more generally, electrically by scrambling the electrical signals relating to the various modes).

At the output of the optical fiber, on the receiver side (not shown), the various modes are spatially demultiplexed, converted to electrical signals by photodetectors and digitized.

The digitized signals may be expressed in the following matrix form:

$$Y = HC + N = \prod_{\ell=1}^{L} \left( P_\ell G_\ell \prod_{k=1}^{K} (T_{\ell,k} R_{\ell,k}) C \right) + N \quad (2)$$

where Y is a matrix of size N×T representing the T signals received over the N modes in the T time transmission intervals (TTIs), H is a matrix of size N×N representing the transmission channel, C is the matrix of size N×T of the spatio-temporal code, and N is a matrix of size N×T whose elements are noise samples (assumed to be additive white Gaussian noise) affecting the signals received over the N modes in the T time transmission intervals, $P_l$ and $G_l$ are, respectively, the permutation matrix of the mode scrambler 150$^l$ and the gain matrix of the amplifier 140$^l$ for the various modes. Stated otherwise, $G_l$ is a diagonal matrix of size N×N whose elements give the respective gains of the amplifier for the various modes. The matrix $G_l$ may be represented by the produce of a medium (scalar) gain with an offset matrix around this gain.

Each slice of fiber may be conceptually divided into K consecutive sections, the characteristics of the fiber being stable along the length of each section and modeled by a matrix product $T_{l,k} R_{l,k}$, where $R_{l,k}$ of size N×N, is the intermodal coupling matrix, relating to section k of slice l, and $T_{l,k}$ is a diagonal matrix, also of size N×N, whose diagonal elements give the respective phase shifts of the various modes over section k of slice l.

The matrix $R_{l,k}$ is assumed to be a random orthogonal matrix ($R_{l,k} \cdot R_{l,k}^T = I_M$, where $I_M$ is the identity matrix), which expresses the conservation of energy distributed over the various modes. The non-diagonal coefficients of the coupling matrix are the intermodal coupling coefficients. Their values depend on the overlap integrals of the field distributions between the various modes being propagated through the section of the slice in question. The overlap integrals themselves depend on the imperfections in and on the curvature of the slice of fiber in this section.

As for the matrix $T_{l,k}$, it is a matrix whose diagonal coefficients take the form $$e^{j\theta^n_{\ell,k}},$$

where $\theta_{l,k}^n$ is the result of drawing a random variable uniformly distributed over $[0, 2\pi]$.

The received signals may be decoded using a maximum likelihood decoder in a manner known per se and recalled below:

The maximum likelihood decoder estimates the code word $\hat{C}_{ML}$ minimizing the Euclidean distance over the set $\Omega$ of possible code words:

$$\hat{C}_{ML} = \underset{C \in \Omega}{\operatorname{argmin}} \|Y - HC\|^2 \quad (3)$$

This search for the minimum assumes prior knowledge of the matrix H representing the transmission channel. This may be determined by channel estimation on the basis of pilot symbols.

The ML decoder by exhaustively searching through the set $\Omega$ is nonetheless complex. More specifically, its complexity varies depending on card $(\Omega)=q^{NT}$, where q is the cardinal of the modulation alphabet. Thus, for a 6×6 TAST code using 4-QAM symbols, the cardinal of the set of codes is card $(\Omega)=4^{36}$.

Alternatively, it will be possible to use a decoder based on the ML criterion yet not requiring an exhaustive search, such as a sphere decoder or even a sphere-bound stack decoder (SB stack decoder), as described in the article by Gaya Rekaya Ben-Othman et al. entitled "The spherical bound stack decoder", published in IEEE Int'l Conf. on wireless and mobile computing, networking and communications (WiMob), Avignon, France, October 2008, or else in the application FR-A-2930861, incorporated by reference.

In another alternative, it will be possible to use a decoder of ZF-DFE (zero-forcing decision feedback equalizer) type, known per se. This decoder is substantially simpler than the ML decoder, but nonetheless gives very good results. To this end, the expression (1) may be transformed into the following vectorized expression:

$$Y'=H'C'+N'=H_{eq}S+N' \quad (4)$$

where Y', N' are vectors of size NT×1 obtained by concatenating the column vectors of the matrices Y and N, respectively. The matrix H' is a block matrix of size NT×NT obtained by replicating the matrix H, T times along the horizontal direction and T times along the vertical direction. C' is a vector of size NT×1 obtained via C'=ΓS, where Γ is the code-generating matrix, of size NT×NT, and S is the vector, of size NT×1, of the modulation symbols. The matrix is defined by $H_{eq}=H'\Gamma$ and is referred to as the equivalent matrix of the transmission channel. The equivalent matrix $H_{eq}$ may be decomposed using QR decomposition, namely $H_{eq}=QR$, where Q is a unitary matrix and R is an upper triangular matrix. ZF-DFE decoding consists of solving the system equivalent to (4):

$$\tilde{Y}=Q^H Y'=RS+Q^H N' \quad (5)$$

The vector $\hat{S}_{ZFDFE}$ is obtained by solving the system $\tilde{Y}=R\hat{S}_{ZFDFE}$ starting with the last component and taking a hard decision on the corresponding symbol. The symbol obtained by hard decision is subsequently inserted into the preceding equation in order to obtain the preceding component. A step-by-step approach is taken thus in order to obtain an estimation of the various transmitted symbols.

FIG. 2A shows the variation in the bit error rate depending on the signal-to-noise ratio for a high level of intermodal coupling. FIG. 2B shows the variation in the bit error rate depending on the signal-to-noise ratio for a medium level of intermodal coupling. Lastly, FIG. 2C shows the variation in the bit error rate depending on the signal-to-noise ratio for a low level of intermodal coupling.

It has been assumed that six modes were being propagated through the fiber ($LP_{01}$, $LP_{11a}$, $LP_{11b}$, $LP_{02}$, $LP_{21a}$, $LP_{21b}$, where the inslices a, b express the anisotropy along two orthogonal axes). The gain has been assumed to be equal to one for mode $LP_{01}$ and the gain offsets $\Delta G_{01-uv}$ (per amplification stage) of modes $LP_{uv}$ have been assumed to be equal to $\Delta G_{01-11}=-1.3$ dB $\Delta G_{01-02}=-0.2$ dB, and $\Delta G_{01-21}=-2$ dB.

Various scenarios are shown in FIGS. 2A-2C.

Scenario 210 shows the case of the conventional additive Gaussian channel. Scenario 220 represents the case of transmission in the absence of spatio-temporal encoding, but with mode scrambling and ML decoding on reception. Scenario 230 corresponds to the case of transmission in the absence of spatio-temporal encoding and mode scrambling, but with ML decoding on reception. Scenario 240 represents transmission with spatio-temporal encoding by means of a 6×6 TAST code, with mode scrambling and ZF-DFE decoding on reception. Scenario 250 represents transmission with spatio-temporal encoding by means of a 6×6 TAST code, without mode scrambling but with ZF-DFE decoding on reception. Scenario 260 corresponds to the case of transmission in the absence of spatio-temporal encoding, but with mode scrambling and ZF-DFE decoding on reception. Scenario 270 corresponds to the case of transmission without spatio-temporal encoding or mode scrambling, but with ZF-DFE decoding on reception. Lastly, scenario 280 corresponds to the case of transmission with spatio-temporal encoding by means of a 6×6 TAST code, mode scrambling and ML decoding on reception.

It is noted that, whatever the level of coupling, the best result is obtained when spatio-temporal encoding (in this instance a 6×6 TAST code) is combined with mode scrambling and ML decoding (curves 280 in FIGS. 2A-2C). The combination of spatio-temporal encoding, mode scrambling and ZF-DFE decoding also leads to a substantial decrease in the bit error rate with respect to the same scenario but without scrambling, when the level of coupling in the fiber is medium or low.

The embodiment shown in FIG. 1 associates a mode scrambler with each amplifier. It will be understood, however, that a mode scrambler will be able to be associated only with some amplifiers, for example only with one amplifier out of Q successive amplifiers, or, more generally, it will be possible to provide P (P≥1) mode scramblers per Q successive amplifiers, namely an equipment ratio of r=P/Q. This ratio will be chosen to be proportionally smaller the greater the intermodal coupling and the tighter the distribution of the gain offset (of the amplifiers). Specifically, both the intermodal coupling in the fiber and the mode scrambling contribute to the decrease in gain mode dispersion in the optical fiber. In an optical fiber without coupling or scrambling, the gain mode dispersion varies by ΔG.L, where ΔG is the maximum gain offset of the amplifiers for the various modes and L is the number of slices of the fiber. A contrario, in the theoretical situation in which the coupling would be maximum, i.e. in the case in which the coupling matrix of a slice would be a random orthogonal matrix, it may be shown that the gain mode dispersion reaches a minimum substantially equal to $\Delta G.\sqrt{L}$. The introduction of scramblers with a rate r makes it possible to approach minimum gain mode dispersion.

Figure 3:
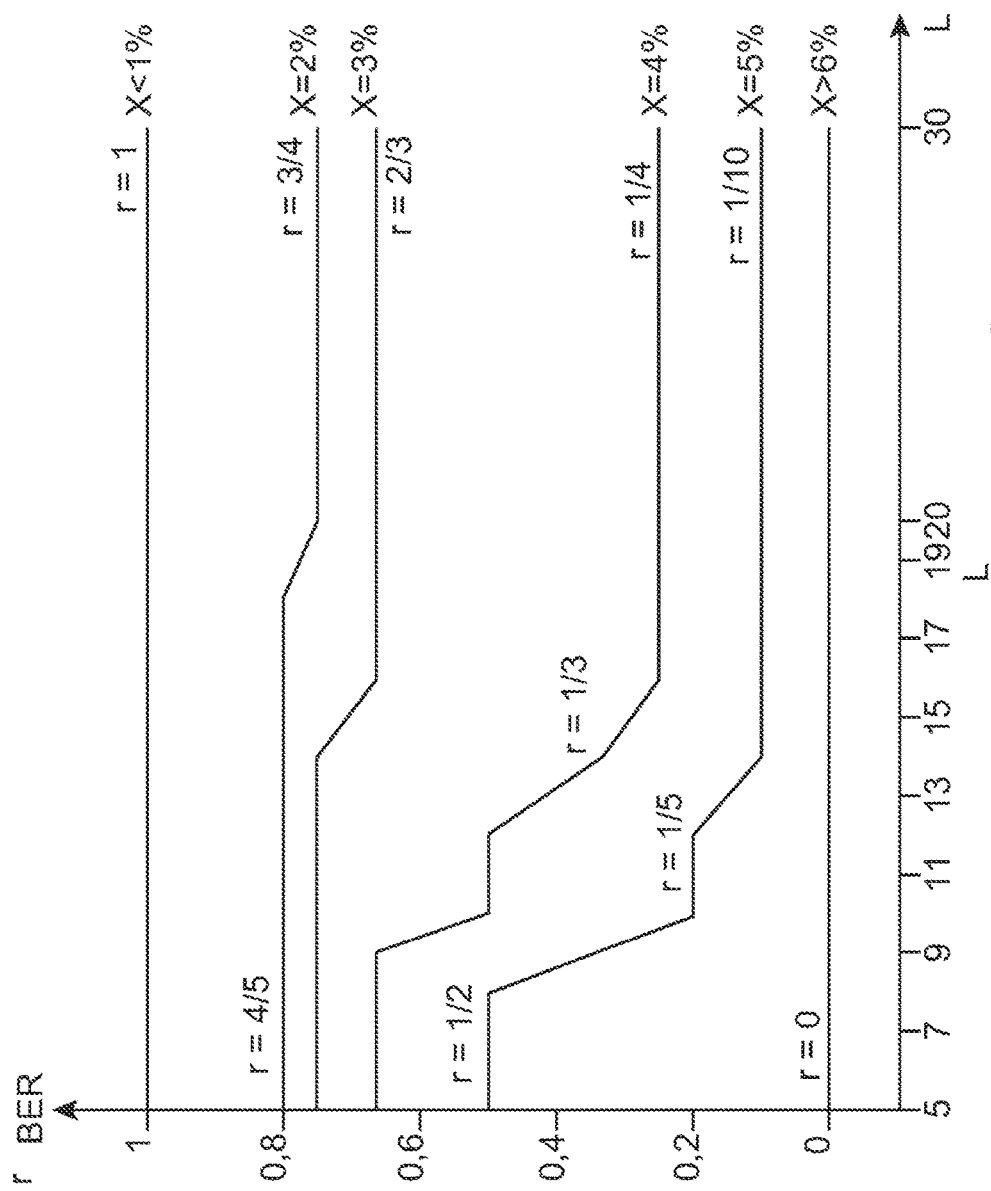
FIG. 3 gives the optimum number of mode scramblers per slice for various levels of intermodal coupling.

FIG. 3 gives the equipment ratio of amplifiers with scramblers in order to obtain minimum gain mode dispersion. The equipment ratio r of amplifiers with scramblers is shown along the ordinate and the number L of slices is shown along the abscissa.

Each slice is assumed to be composed of K=400 sections with coupling ratios per slice equivalent to those caused by maximum core misalignments between consecutive sections which are equal to a fraction x % of the core radius. These misalignments represent imperfections in the fiber and cause intermodal coupling. The maximum gain offset per amplification stage was ΔG=2 dB in this instance.

It is noted in the figure that beyond a certain number of slices, the equipment ratio for obtaining minimum gain mode dispersion tends toward a minimum ratio. Thus, for example, for a core misalignment of 4%, minimum gain mode dispersion may be obtained by equipping one in four amplifiers with a scrambler, whenever the fiber comprises more than 16 slices.

In general, from the maximum gain offset and the intermodal coupling ratio, it is possible to determine the optimum equipment ratio of the amplifiers. This ratio is optimum in the sense that, on the one hand, it allows minimum gain mode dispersion to be reached and, on the other hand, the provision of additional scramblers would not lead to an improvement in performance in terms of bit error rate.

Figure 4:
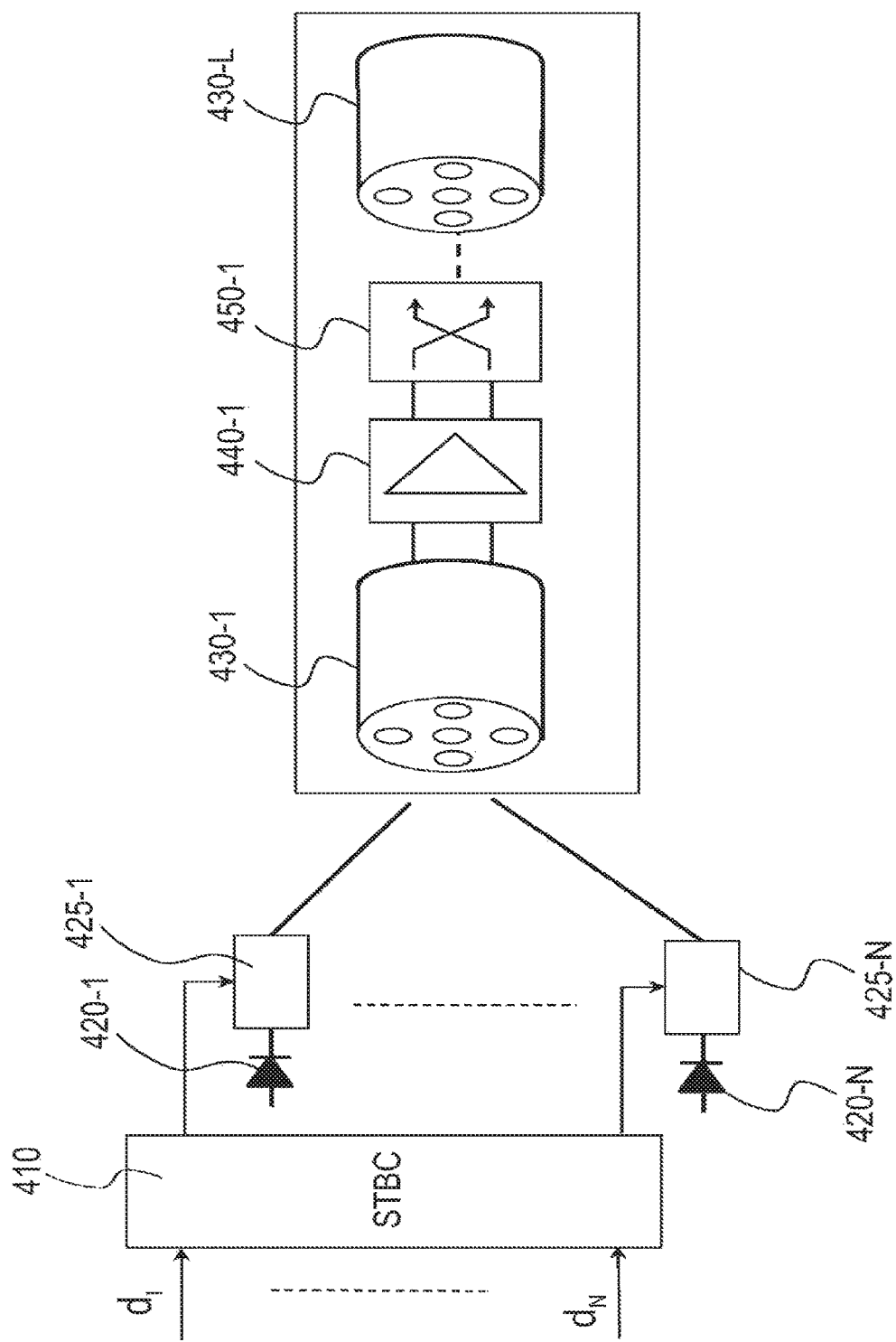
FIG. 4 schematically shows a system for transmission over optical fiber according to a second embodiment of the invention.

FIG. 4 schematically shows a system for transmission over optical fiber according to a second embodiment of the invention.

In contrast to the first embodiment, the fiber used is, in this instance, of multicore type.

The optical transmission system comprises a spatio-temporal encoder 410, identical to the spatio-temporal encoder 110, N lasers $420_n$, n=1, . . . , N, of the same wavelength, or else alternatively a single laser whose beam is split into N separate beams. The beams are respectively modulated by the various outputs of the spatio-temporal encoder by means of the modulators $425_n$, n=1, . . . , N. The optical beams thus modulated are respectively injected into the various cores of the fiber. This injection may be achieved either by means of an optical device in free space or by means of a guided optics multiplexer.

The multicore fiber 430 comprises a plurality L of slices, $430^l$, l=1, . . . , L, an amplifier $440_k$ being provided between each pair of consecutive slices $430^l$ and $430^l$+1. Each amplifier $440^l$ is associated with a core scrambler, $450^l$, located upstream or downstream of the amplifier.

The various modes described with respect to the first embodiment also find application here. In particular, the amplifier may be an optical amplifier or comprise photodiodes and amplifiers followed by laser diodes. Likewise, the core scramblers may be optically or digitally (and, more generally, electrically) implemented. Those skilled in the art will understand that the various types of decoding mentioned in the first embodiment are applied in the same manner to the second embodiment.

The invention claimed is:

1. A system for optical transmission over multimode fiber comprising:
   an encoder, referred to as a spatio-temporal encoder, transforming each block of symbols to be transmitted into a code matrix, each element of said matrix being related to a time of use and to a propagation mode of said fiber;
   a plurality of modulators respectively associated with separate propagation modes of said fiber, each modulator modulating a laser beam for a time of use by means of a corresponding element of the matrix, each laser beam thus modulated being injected into said fiber in order to propagate therethrough according to a separate mode;
   wherein:
      said fiber comprises a plurality of slices, an amplifier being provided between any two consecutive slices in order to amplify the intensity of the beams being propagated in said modes;
      a mode scrambler is associated with said amplifier in order to perform a permutation of said modes between at least two consecutive slices;
      a said plurality of slices of the fiber comprises L slices, and P mode scramblers are provided for every Q amplifiers, a ratio P/Q being chosen so that a gain mode dispersion of the fiber reaches a minimum value related to a maximum gain offset ΔG of the amplifiers for said modes and the number L of slices in said fiber.

2. The optical transmission system of claim 1, wherein the spatio-temporal encoder uses a TAST code.

3. The optical transmission system of claim 1, wherein the spatio-temporal encoder uses a perfect code.

4. The optical transmission system of claim 1, wherein each modulator is a QAM modulator, followed by an OFDM modulator.

5. The optical transmission system of claim 1, wherein the amplifiers are optical amplifiers.

6. The optical transmission system of claim 1, wherein each amplifier provided between any two consecutive slices comprises a plurality of photodiodes for converting the optical signals of the various modes to electrical signals, elementary amplifiers amplifying the various electrical signals, and a plurality of laser diodes modulated, respectively, by the electrical signals thus amplified.

7. A system for optical transmission over multicore fiber comprising:
   an encoder, referred to as a spatio-temporal encoder, transforming each block of symbols to be transmitted into a code matrix, each element of said matrix being related to a time of use and to a core of said fiber;
   a plurality of modulators associated, respectively, with cores of said fiber, each modulator modulating a laser beam for a time of use by means of a corresponding element of the matrix, each laser beam thus modulated being injected into a separate core of said fiber;
   wherein:
      said fiber comprises a plurality of slices, an amplifier being provided between any two consecutive slices in order to amplify the intensity of the beams being propagated through said plurality of cores;
      a core scrambler is associated with said amplifier in order to effect a permutation of the beams of the various cores between at least two consecutive slices;
      said plurality of slices of the fiber comprises L slices, and P core scramblers are provided for every Q amplifiers, a ratio P/Q being chosen so that a gain mode dispersion of the fiber reaches a minimum value related to a maximum gain offset ΔG of the amplifiers for the various cores and the number L of slices in said fiber.

8. The optical transmission system as claimed in claim 7, wherein each modulator is a QAM modulator, followed by an OFDM modulator.

9. The optical transmission system as claimed in claim 7, wherein the amplifiers are optical amplifiers.

10. The optical transmission system as claimed in claim 7, wherein each amplifier provided between any two consecutive slices comprises a plurality of photodiodes for converting the optical signals of the various modes to electrical signals, elementary amplifiers amplifying the various electrical signals, and a plurality of laser diodes modulated, respectively, by the electrical signals thus amplified.

11. A method for optical transmission over multimode fiber comprising:
an encoding operation, referred to as a spatio-temporal encoding, transforming each block of symbols to be transmitted into a code matrix, each element of said matrix being related to a time of use and a propagation mode of said fiber;
modulating a plurality of laser beams associated with the various modes, each laser beam being modulated for a time of use by means of a corresponding element of the matrix, each laser beam thus modulated being injected into said fiber in order to propagate therethrough according to a separate mode;
wherein:
the intensity of the beams propagating in said modes is amplified between any two consecutive slices of said fiber;
the modes are scrambled between at least two consecutive slices;
said plurality of slices of the fiber comprises L slices, and P mode scrambling steps are provided for every Q amplification steps a ratio P/Q being chosen so that a gain mode dispersion of the fiber reaches a minimum value related to a maximum gain offset $\Delta G$ of amplifiers for said modes and the number L of slices in said fiber.

12. The optical transmission system of claim 11, wherein the spatio-temporal encoding uses a TAST code.

13. The optical transmission system of claim 11, wherein the spatio-temporal encoding uses a perfect code.

14. The optical transmission method of claim 11, wherein the modulation comprises a first, QAM modulation step followed by a second, OFDM modulation step.

15. The optical transmission method of claim 11, wherein the amplification between two consecutive slices is carried out by means of optical pumping.

16. The optical transmission method of claim 11, wherein amplification between two consecutive slices is carried out by means of optical-electrical conversion, amplification of the electrical signals thus obtained and electrical-optical conversion of the electrical signals thus amplified.

17. A method for optical transmission over multicore fiber comprising:
an encoding operation, referred to as a spatio-temporal encoding, transforming each block of symbols into a code matrix, each element of said matrix being related to a time of use and a core of said fiber;
modulating a plurality of laser beams associated with the various cores, each laser beam being modulated for a time of use by means of a corresponding element of the matrix, each laser beam thus modulated being injected into a separate core of said fiber;
wherein:
the intensity of the beams propagating through said cores is amplified between any two consecutive slices of said fiber;
the beams of the various cores are scrambled between at least two consecutive slices;
said plurality of slices of the fiber comprises L slices, and P core scrambling steps being provided for every Q amplification steps, a ratio P/Q being chosen so that a gain mode dispersion of the fiber reaches a minimum value related to a maximum gain offset $\Delta G$ of amplifiers for the various cores and the number L of slices in said fiber.

18. The optical transmission method as claimed in claim 17, characterized in one of that the modulation comprises a first, QAM modulation step followed by a second, OFDM modulation step.

19. The optical transmission method as claimed in claim 17, wherein amplification between two consecutive slices is carried out by means of optical pumping.

20. The optical transmission method as claimed in claim 17, wherein amplification between two consecutive slices is earned out by means of optical-electrical conversion, amplification of the electrical signals thus obtained and electrical-optical conversion of the electrical signals thus amplified.

* * * * *